United States Patent Office 3,780,023
Patented Dec. 18, 1973

3,780,023
2-ARALKYLAMINO-4,5-DIHYDRO-3H-1,3-BENZODIAZEPINES
John T. Suh, 3709 W. Scenic Drive, 111 N., Mequon, Wis. 53092, and Richard A. Schnettler, 6234 W. Donges Lane, Brown Deer, Wis. 53223
No Drawing. Filed June 30, 1972, Ser. No. 268,129
Int. Cl. C07d 53/04
U.S. Cl. 260—239 BD  9 Claims

ABSTRACT OF THE DISCLOSURE

The 2-aralkylamino-4,5-dihydro-3H-1,3-benzodiazepines and their pharmaceutically acceptable acid addition salts are central nervous system depressants possessing tranquilizing activity. A compound disclosed is 2-benzylamino-4,5-dihydro-3H-1,3-benzodiazepine hydrochloride.

DETAILED DESCRIPTION

The compounds of the present invention have the following formula

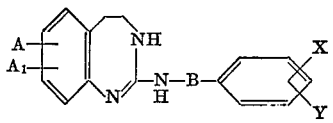

in which A, $A_1$, X and Y are selected from hydrogen, hydroxy, halogen, $CF_3$, alkyl of 1 to 4 carbon atoms or alkoxy of 1 to 4 carbon atoms, especially methoxy, and B is an alkylene of 1 to 4 carbon atoms, including methylene, ethylene and isopropylene.

BACKGROUND OF THE INVENTION

U.S. Pat. No. 3,496,179 discloses 2-amino-3,4-dihydroquinazolines which are antihypertensive agents and an article by H. R. Rodriguez, et al., J. Org. Chem., 33, 670 (1968), discloses the compound 2-amino-4,5-dihydro-7,8-dimethoxy-3H-1,3-benzodiazepine. Other patents of possible interest are British Pat. No. 1,183,135, German Pat. No. 1,947,062, and U.S. Pats. Nos. 3,474,090 and 3,157,642.

PREPARATION OF THE COMPOUNDS

The compounds of the present invention are readily prepared from β-(2-aminophenyl)ethylamines of the formula

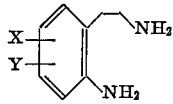

which are known compounds.

Representative of the amines that may be used as starting materials are the following:

β-(2-aminophenyl) ethylamine,
β-(2-amino-4,5-dimethoxyphenyl) ethylamine,
β-(2-amino-4,6-dimethoxyphenyl) ethylamine;
β-(2-amino-4,5-dichlorophenyl) ethylamine,
β-(2-amino-3,6-dichlorophenyl) ethylamine,
β-(2-amino-4,5-ditrifluoromethylphenyl) ethylamine, and
β-(2-amino-4,5-dimethylphenyl) ethylamine.

The compounds of the invention are conveniently prepared by reacting the selected β-(2-aminophenyl) ethylamine with carbon disulfide in ethanol to form the corresponding 2,3,4,5-tetrahydro-1H-1,3-benzodiazepine-2-thione which, when treated with methyliodide in a mixture of methanol and ethanol, forms the corresponding 2-methylmercapto-4,5-dihydro-3H-1,3-benzodiazepine hydroiodide. The thus obtained hydroiodide is then dissolved in anhydrous acetonitrile and reacted with an appropriate aralkylamine under reflux conditions to form the desired 2-aralkylamino-4,5-dihydro-3H-1,3-benzodiazepine.

The described process may be illustrated as follows:

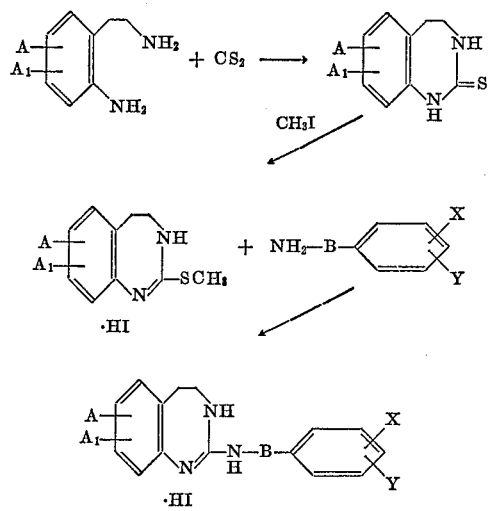

in which A, $A_1$, X and Y are as previously defined.

Representative of the aralkylamines which may be employed in the described process are the following:

β-phenylethylamine,
benzylamine,
β-(3,4-dimethoxyphenyl)ethylamine,
α-phenylethylamine,
β-(2,6-dichlorophenyl)ethylamine, and
4-fluorobenzylamine.

Among the compounds which may be prepared by the described process are the following:

2-(β-phenylethylamino)-4,5-dihydro-3H-1,3-benzodiazepine hydroiodide,
2-[β-(3,4-dimethoxyphenyl)ethylamino]-4,5-dihydro-3H-1,3-benzodiazepine hydroiodide,
2-benzylamino-4,5-dihydro-3H-1,3-benzodiazepine hydroiodide, and
2-[α-(4-chlorophenyl)ethylamino]-4,5-dihydro-3H-1,3-benzodiazepine hydroiodide.

The compounds in which A, $A_1$, X and/or Y are hydroxy may be readily prepared from the corresponding compounds in which X and Y are aralkoxy or alkoxy by conventional procedures.

Acid addition salts of the compounds of the present invention may be conveniently produced by contacting the free base form of the compounds with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Pats. 2,425,320 and 2,606,155. The compounds also form fluosilicic acid addition salts which are useful as mothproofing agents according to U.S. Pats. 1,915,334 and 2,075,359.

The compounds of the invention are pharmacologically active. For example, the compound 2-benzylamino-4,5-dihydro-3H-1,3-benzodiazepine hydrochloride, when evaluated in mouse behavioral studies at intraperitoneal doses of 1 to 10 mg./kg, were found to produce behavioral profiles resembling those of central nervous system depressants of the tranquilizer type. The mouse behavioral studies also indicated that the compounds were relatively safe and possessed $LD_{50}$'s in excess of 20 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Siegler, ed., Year Book Medical Publishers, Inc., 1964.

When intended for pharmaceutical use, the compounds are preferably combined with one or more suitable pharmaceutical diluents and additives and formed into unit dosage forms for oral or parenteral administration such as tablets, capsules and solutions.

The following examples are presented to illustrate this invention:

EXAMPLE 1

7,8-dimethoxy-2,3,4,5-tetrahydro-1H-1,3-benzodiazepin-2-thione

In 160 ml. ethanol 10.0 g. (0.0442 mole) β-(2-nitro-4,5-dimethoxyphenyl)ethylamine is dissolved and 0.2 g. platinum oxide is suspended. The mixture is shaken until the theoretical amount of hydrogen is taken up. The mixture is filtered and set aside.

In 20 ml. ethanol 7.6 g. (0.1 mole) carbon disulfide is dissolved. The solution is chilled to 0° C. and the above solution slowly added dropwise over a one hour period. The solution is maintained at 0° C. during the addition and then allowed to stir at room temperature for 48 hours and finally refluxed 2 hours. The system is cooled and the solid collected to give 7,8-dimethoxy-2,3,4,5-tetrahydro-1H-1,3-benzodiazepin-2-thione as a yellow solid, M.P. 250°.

EXAMPLE 2

2-methylmercapto-7,8-dimethoxy-4,5-dihydro-3H-1,3-benzodiazepine hydroiodide

In 200 ml. methanol is suspended 18.70 g. (0.0785 mole) 7,8 - dimethoxy - 2,3,4,5 - tetrahydro-1H-1,3-benzodiazepin-2-thione and 11.2 g. (0.079 mole) methyl iodide is added dropwise. The mixture is refluxed and stirred 2 hours, cooled and filtered. The filtrate is diluted with ether until all the solid has precipitated to give 2-methylmercapto - 7,8 - dimethoxy - 4,5-dihydro-3H-1,3-benzodiazepine hydroiodide as a beige solid, M.P. 197–200°.

EXAMPLE 3

2,3,4,5-tetrahydro-1H-1,3-benzodiazepin-2-thione

In 50 ml. ethanol is dissolved 9.2 g. (0.12 mole) carbon disulfide and the solution is chilled in an icebath. β-(2-aminophenyl)ethylamine is slowly added over a 30 minute period. The mixture is allowed to stand for 17 hours at room temperature and then refluxed for 2 hours, cooled, and the solid collected to give 2,3,4,5-tetrahydro-1H-1,3-benzodiazepin-2-thione, M.P. 195°.

EXAMPLE 4

2-methylmercapto-4,5-dihydro-3H-1,3-benzodiazepine hydroiodide

In a mixture of 100 ml. ethanol and 100 ml. methanol is dissolved 4.54 g. (0.0255 mole) 2,3,4,5-tetrahydro-1H-1,3-benzodiazepin-2-thione and 3.64 g. (0.026 mole) methyl iodide. The mixture is refluxed one hour and concentrated to 50 ml., filtered, and diluted with ether to precipitate the salt. 2-methylmercapto-4,5-dihydro-3H-1,3-benzodiazepine hydroiodide as a white solid is collected, M.P. 175°.

EXAMPLE 5

2-(β-phenylethylamino)-4,5-dihydro-3H-1,3-benzodiazepine hydroiodide

A solution of 4.8 g. (0.015 mole) of 2-methylmercapto-4,5-dihydro-3H-1,3-benzodiazepine hydroiodide and 3.6 g. (0.03 mole) of β-phenylethylamine in 25 ml. of acetonitrile is refluxed four hours, cooled, the solids filtered, and recrystallized in ethyl alcohol. The white crystals of 2 - (β - phenylethylamino) - 4,5-dihydro-3H-1,3-benzodiazepine hydroiodide which are collected melt at 203.5–206°.

*Analysis.*—Calcd. for $C_{17}H_{20}IN_3$ (percent): C, 51.92; H, 5.13; N, 10.69. Found (percent): C, 51.93; H, 4.96; N, 10.54.

EXAMPLE 6

2-benzylamino-4,5-dihydro-3H-1,3-benzodiazepine hydrochloride

A solution of 4.8 g. (0.015 mole) of 2-methylmercapto-4,5-dihydro-3H-1,3-benzodiazepine hydroiodide and 3.2 g. (0.03 mole) of benzylamine in 20 ml. of acetonitrile is refluxed for 20 hours, cooled, poured into 500 ml. of water and washed with ether. The aqueous portion is made alkaline with 10% sodium hydroxide solution and the resulting oil extracted into chloroform, washed with water, saturated brine and dried over $Na_2SO_4$. Removal of the solvent leaves a viscous oil which is dissolved in isopropyl alcohol, treated with ethereal hydrogen chloride, the solids are filtered and recrystallized in ethyl alcohol to afford 2 - benzylamino - 4,5 - dihydro - 3H-1,3-benzodiazepine hydrochloride as white crystals, M.P. 190–192°.

*Analysis.*—Calcd. for $C_{16}H_{18}ClN_3$ (percent): C, 66.77; H, 6.30; N, 14.60. Found (percent): C, 66.46; H, 6.40; N, 14.47.

EXAMPLE 7

2-[β-(3,4-dimethoxyphenyl)ethylamino]-4,5-dihydro-3H-1,3-benzodiazepine hydrochloride A solution of 4.8 g. (0.015 mole) of 2-methylmercapto-4,5-dihydro-3H-1,3-benzodiazepine hydroiodide and 5.4 g. (0.03 mole) of β-(3,4-dimethoxyphenyl)ethylamine in 25 ml. of aectonitrile is refluxed for 20 hours, cooled, poured into 500 ml. of water and washed with ether. The aqueous portion is made alkaline with 10% sodium hydroxide solution and the resulting oil is extracted into chloroform, washed with water, saturated brine and dried ($Na_2SO_4$). Removal of the solvent leaves an amber oil which is treated with ethereal hydrogen chloride. The solids are filtered, recrystallized from isopropyl alcohol to afford 2 - [β - (3,4 - dimethoxyphenyl)ethylamino]-4,5-dihydro-3H-1,3-benzodiazepine hydrochloride as a white crystalline solid, M.P. 187–189.5°.

*Analysis.*—Calcd. for $C_{19}H_{24}ClN_3O_2$ (percent): C, 63.06; H, 6.68; N, 11.63. Found (percent): C, 62.59; H, 6.99; N, 11.34.

We claim:

1. A compound selected from a compound of the formula and pharmaceutically acceptable salts thereof, in which A, $A_1$, X and Y are hydrogen, hydroxy, halogen, $CF_3$, lower alkoxy of 1 to 4 carbon atoms or lower alkyl of 1 to 4 carbon atoms, and B is an alkylene of 1 to 4 carbon atoms.

2. A compound of claim 1 in which A, $A_1$, X and Y are hydrogen.

3. A compound of claim 1 in which A and $A_1$ are hydrogen or methoxy.

4. A compound of claim 1 in which X and Y are methoxy.

5. A compound of claim 1 in which X and Y are hydrogen or methoxy.

6. The compound of claim 1 in which A, $A_1$, X and Y are hydrogen and B is ethylene.

7. The compound of claim 1 in which A, $A_1$, X and Y are hydrogen and B is methylene.

8. The compound of claim 1 in which A and $A_1$ are hydrogen, B is ethylene, and X and Y are 3-methoxy and 4-methoxy, respectively.

9. A compound of claim 1 in which B is methylene or ethylene.

References Cited

UNITED STATES PATENTS

| 3,496,179 | 2/1970 | Hess | 260—256.4 Q |
| 3,681,340 | 8/1972 | Rodreguez et al. | 260—239 BD |

ALTON D. ROLLINS, Primary Examiner

U.S. Cl. X.R.

260—239.3 B; 424—244